US010599658B2

(12) United States Patent
Watanabe

(10) Patent No.: US 10,599,658 B2
(45) Date of Patent: Mar. 24, 2020

(54) SEARCH DEVICE, SEARCH METHOD, AND NON-TRANSITORY COMPUTER READABLE MEDIUM FOR PERFORMING A SEARCH FOR CANDIDATE EXPERTS AND DISPLAYING RESULTS OF THE SEARCH

(71) Applicant: FUJI XEROX CO., LTD., Tokyo (JP)

(72) Inventor: Yuta Watanabe, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 477 days.

(21) Appl. No.: 15/061,315

(22) Filed: Mar. 4, 2016

(65) Prior Publication Data

US 2017/0046397 A1 Feb. 16, 2017

(30) Foreign Application Priority Data

Aug. 14, 2015 (JP) ................. 2015-160193

(51) Int. Cl.
*G06F 16/2457* (2019.01)
*G06F 16/248* (2019.01)
*G06F 16/2455* (2019.01)
*G06Q 50/00* (2012.01)
*G06F 16/9535* (2019.01)

(52) U.S. Cl.
CPC ...... *G06F 16/24575* (2019.01); *G06F 16/248* (2019.01); *G06F 16/2455* (2019.01); *G06F 16/9535* (2019.01); *G06Q 50/01* (2013.01)

(58) Field of Classification Search
CPC ......... G06F 17/30528; G06F 17/30554; G06F 17/30477; G06F 16/24575; G06F 16/9535; G06F 16/2455; G06F 16/248; G06Q 50/01
See application file for complete search history.

(56) References Cited

U.S. PATENT DOCUMENTS

2006/0168073 A1* 7/2006 Kogan ................. H04L 67/306
709/206
2008/0189367 A1 8/2008 Okumura
(Continued)

FOREIGN PATENT DOCUMENTS

| JP | 2001-060200 A | 3/2001 |
| JP | 2008-191748 A | 8/2008 |
| JP | 2011-237912 A | 11/2011 |

OTHER PUBLICATIONS

Bok, An Expert Search Scheme Using User Activities and Reliabilities in Social Networks, pp. 157-161, Feb. (Year: 2015).*
(Continued)

*Primary Examiner* — Albert M Phillips, III
(74) *Attorney, Agent, or Firm* — Oliff PLC

(57) ABSTRACT

A search device includes a selecting unit, a calculating unit, and a presenting unit. The selecting unit analyzes use history of a communication tool and selects a candidate expert having a relationship with a searcher who wishes to search for an expert having some expertise in a specified category. The calculating unit analyzes expertise levels of users of the communication tool, the expertise levels being regarding the category. The presenting unit presents, as the expert, to the searcher, a candidate expert selected as one having some level of relationship with the searcher and having some level of expertise on the basis of the analysis by the selecting unit and the calculating unit.

9 Claims, 15 Drawing Sheets

(56) References Cited

U.S. PATENT DOCUMENTS

| | | | |
|---|---|---|---|
| 2009/0024605 A1* | 1/2009 | Yang | G06F 16/9535 |
| 2011/0035329 A1* | 2/2011 | Delli Santi | G06Q 30/02 |
| | | | 705/347 |
| 2011/0055207 A1* | 3/2011 | Schorzman | G06F 17/30699 |
| | | | 707/723 |
| 2013/0282698 A1* | 10/2013 | Oztekin | G06F 17/30554 |
| | | | 707/722 |
| 2016/0337287 A1* | 11/2016 | Dong | H04L 51/12 |

OTHER PUBLICATIONS

Sun, SmallBlue: People Mining for Expertise Search, pp. 78-84, Mar. (Year: 2008).*

IPCOM000227748D, Method and System for an Instant Messaging Based Expert System, 4 pages, May 14 (Year: 2013).*

Jun. 11, 2019 Office Action issued in Japanese Patent Application No. 2015-160193, 5 pages.

* cited by examiner

FIG. 4

| Operator (necessary) : | A |
| --- | --- |
| Keyword (necessary) : | Web marketing |
| Number of interconnections : | 1 |
| Period : | 04/01/2013  TO  03/31/2015 |

Analyze

FIG. 5

| SENDER | RECIPIENT (TO) | RECIPIENT (CC) | RECIPIENT (BCC) | SUBJECT | BODY | ATTACHED FILE |
|---|---|---|---|---|---|---|
| A | B | | | DIGITAL MARKETING | | |
| A | C | G, F | | ACCESS ANALYSIS | | |
| D | E | K | | | | |
| E | A | | Q | ABOUT EXAMINATION ON HubSpot | | |
| ... | | | | | | |

FIG. 6

| USER NAME | RELATIONSHIP LEVEL | NUMBER OF SENT EMAILS | NUMBER OF SENT EMAILS (NORMALIZED) | NUMBER OF RECEIVED EMAILS (TO) | NUMBER OF RECEIVED EMAILS (TO) (NORMALIZED) | NUMBER OF RECEIVED EMAILS (CC) | NUMBER OF RECEIVED EMAILS (CC) (NORMALIZED) | NUMBER OF RECEIVED EMAILS (BCC) | NUMBER OF RECEIVED EMAILS (BCC) (NORMALIZED) | FLAG FOR 0 INTER-CONNECTIONS |
|---|---|---|---|---|---|---|---|---|---|---|
| B | 94 | 657 | 100 | 582 | 97 | 20 | 50 | 7 | 35 | Y |
| C | 88 | 571 | 87 | 268 | 45 | 13 | 33 | 20 | 100 | Y |
| D | 85 | 428 | 75 | 602 | 100 | 5 | 13 | 0 | 0 | Y |
| G | 79 | 308 | 72 | 400 | 66 | 6 | 15 | 0 | 0 | Y |
| J | 77 | 185 | 60 | 126 | 21 | 40 | 100 | 5 | 25 | Y |
| ... | | | | | | | | | | |

FIG. 7

| USER NAME | EXPERTISE LEVEL | NUMBER OF MESSAGES | NUMBER OF RELATED WORDS | NUMBER OF PAGE VIEWS | ... |
|---|---|---|---|---|---|
| B | 67 | 46 | 478 | 595 | |
| C | 85 | 75 | 687 | 3251 | |
| D | 12 | 2 | 12 | 1 | |
| G | 73 | 52 | 432 | 842 | |
| J | 55 | 48 | 301 | 468 | |

FIG. 8

| USER NAME | EXPERTISE LEVEL | RELATIONSHIP LEVEL | ROUTE | ... |
|---|---|---|---|---|
| H | 88 | 46 | J | |
| S | 81 | 25 | J | |
| P | 72 | 33 | J | |

FIG. 9

| USER NAME | EXPERTISE LEVEL | RELATIONSHIP LEVEL | ... |
|---|---|---|---|
| W | 92 | 12 | |
| Q | 89 | 22 | |
| K | 85 | 18 | |

FIG. 10

| USER ID | EVENT ID | EVENT NAME | SCHEDULED START TIME AND DATE | SCHEDULED END TIME AND DATE | PLACE |
|---|---|---|---|---|---|
| A | e00001 | PATENT REVIEW MEETING | 10/01/2015 10:00 | 10/01/2015 11:00 | OFFICE X |
| A | e00002 | OBJECT REVIEW MEETING | 10/01/2015 15:30 | 10/01/2015 17:00 | OFFICE Y |
| B | e00003 | MEETING ABOUT CASE A | 10/01/2015 11:00 | 10/01/2015 12:00 | OFFICE Y |
| B | e00004 | MEETING ABOUT CASE B | 10/01/2015 13:30 | 10/01/2015 14:30 | OFFICE Y |
| C | e00005 | MEETING ABOUT CASE C | 10/01/2015 10:00 | 10/01/2015 11:00 | OFFICE Y |
| C | e00006 | MEETING ABOUT CASE D | 10/01/2015 14:30 | 10/01/2015 15:30 | OFFICE X |
| ... | | | | | |

| MARKS | WHAT MARK MEANS |
|---|---|
|  | BUSY (NUMBER OF DROPS REPRESENTS HOW BUSY) |
| AVL | AVAILABLE |
| 2d | PROBABLY COMING IN TWO DAYS |
|  | WILLING TO GIVE ADVICE EVEN IF BUSY |
|  | SEEMS HAPPY |

SEARCH DEVICE, SEARCH METHOD, AND NON-TRANSITORY COMPUTER READABLE MEDIUM FOR PERFORMING A SEARCH FOR CANDIDATE EXPERTS AND DISPLAYING RESULTS OF THE SEARCH

CROSS-REFERENCE TO RELATED APPLICATIONS

This application is based on and claims priority under 35 USC 119 from Japanese Patent Application No. 2015-160193 filed Aug. 14, 2015.

BACKGROUND (i) Technical Field

The present invention relates to a search device, a search method, and a non-transitory computer readable medium.

(ii) Related Art

A user found in a know-who search (expertise finding) of the related art, which uses users' profiles and information of document management systems, may often be a complete stranger to a searcher. Even if the found user has information and expertise that the searcher wishes to know, the searcher may be disinclined to contact such a stranger.

SUMMARY

According to an aspect of the invention, there is provided a search device including a selecting unit, a calculating unit, and a presenting unit. The selecting unit analyzes use history of a communication tool and selects a candidate expert having a relationship with a searcher who wishes to search for an expert having some expertise in a specified category. The calculating unit analyzes expertise levels of users of the communication tool, the expertise levels being regarding the category. The presenting unit presents, as the expert, to the searcher, a candidate expert selected as one having some level of relationship with the searcher and having some level of expertise on the basis of the analysis by the selecting unit and the calculating unit.

BRIEF DESCRIPTION OF THE DRAWINGS

An exemplary embodiment of the present invention will be described in detail based on the following figures, wherein:

FIG. 4 illustrates an example of a search-condition input screen displayed in this exemplary embodiment;

FIG. 5 illustrates an exemplary data structure of a communication information management table for email in this exemplary embodiment;

FIG. 6 illustrates an exemplary data structure of a relationship-level analysis-result table in this exemplary embodiment;

FIG. 7 illustrates an exemplary data structure of an expertise-level analysis-result table in this exemplary embodiment;

FIG. 8 illustrates an exemplary data structure of an expertise-level and relationship-level analysis-result table in this exemplary embodiment;

FIG. 9 illustrates an exemplary data structure of an expertise-level and relationship-level analysis-result table in this exemplary embodiment;

FIG. 10 illustrates an exemplary data structure of schedule information stored in a schedule-information memory in this exemplary embodiment;

DETAILED DESCRIPTION

An exemplary embodiment of the present invention will be described below with reference to the attached drawings.

Figure 1:
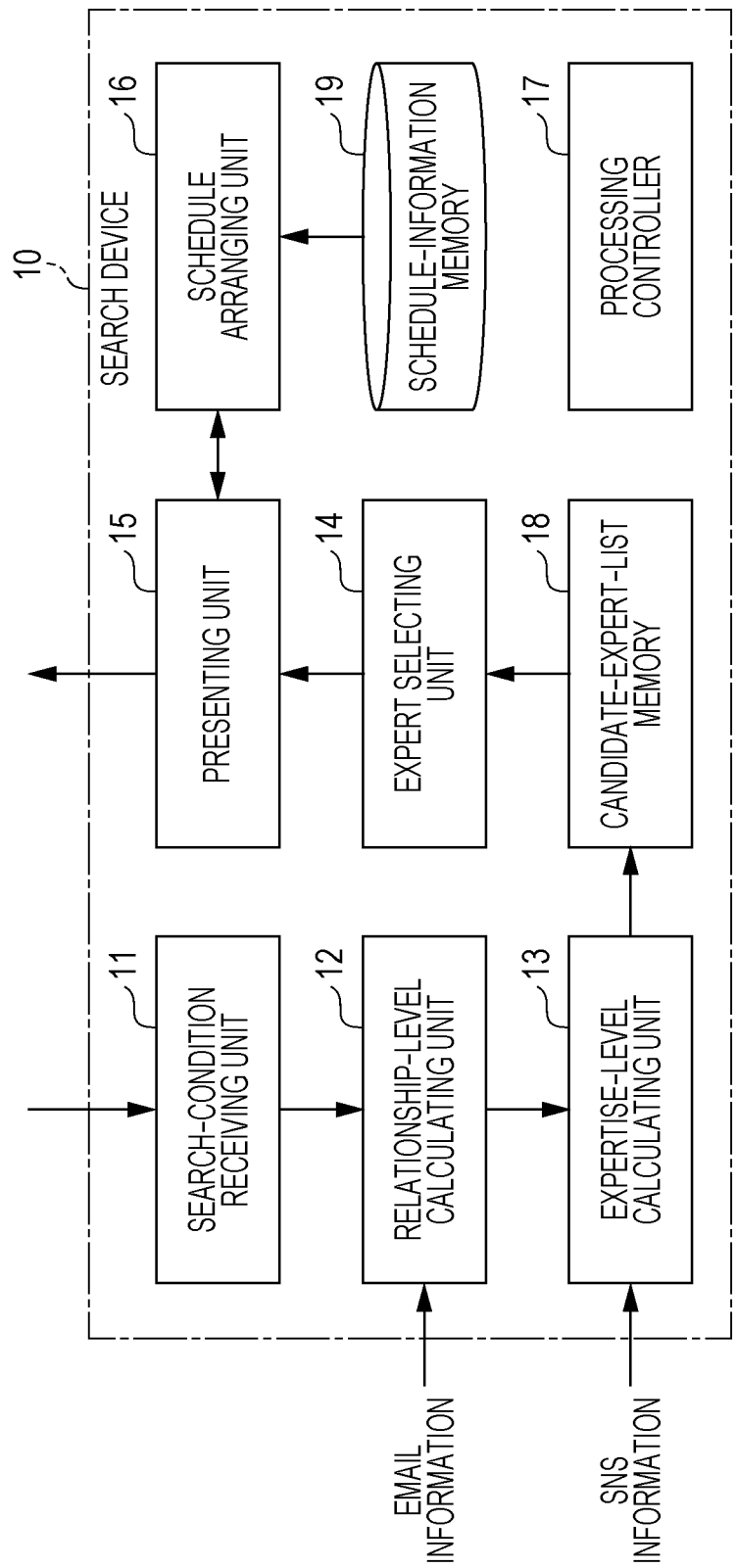
FIG. 1 is a block diagram illustrating a configuration of a search device according to an exemplary embodiment of the present invention.
Figure 2:
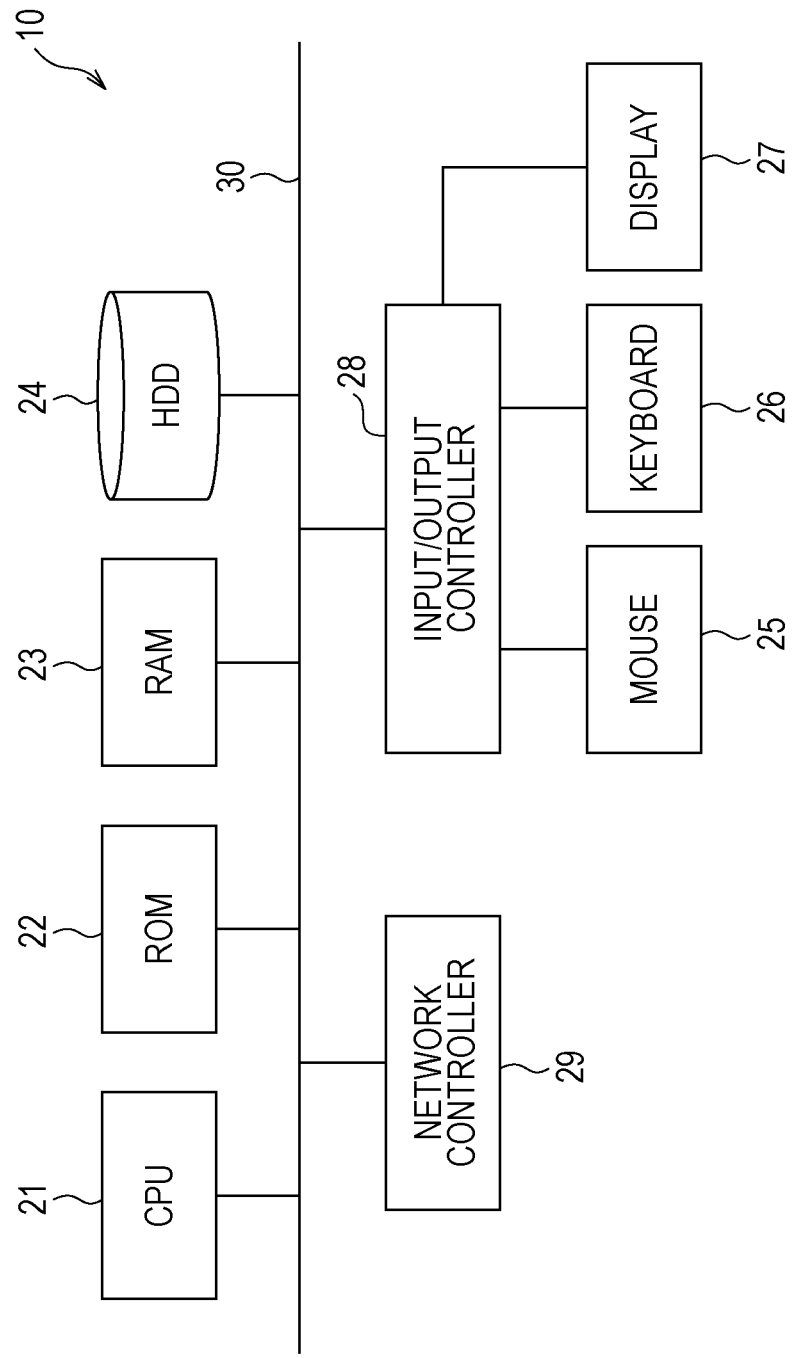
FIG. 2 is illustrates a hardware configuration of the search device in this exemplary embodiment.

FIG. 1 is a block diagram illustrating a configuration of a search device 10 according to an exemplary embodiment of the present invention. FIG. 2 illustrates a hardware configuration of a computer serving as the search device 10 in this exemplary embodiment. The search device 10 in this exemplary embodiment may be realized by an existing general-purpose hardware configuration. That is, as illustrated in FIG. 2, the search device 10 includes a central processing unit (CPU) 21, a read only memory (ROM) 22, a random access memory (RAM) 23, a hard disk drive (HDD) 24, an input/output controller 28 connected to a mouse 25 and a keyboard 26 provided as input units and to a display 27 provided as a display device, and a network controller 29 provided as a communication unit. The CPU 21, the ROM 22, the RAM 23, the HDD 24, the input/output controller 28, and the network controller 29 are connected to an internal bus 30.

As illustrated in FIG. 1, the search device 10 according to this exemplary embodiment includes a search-condition receiving unit 11, a relationship-level calculating unit 12, an expertise-level calculating unit 13, an expert selecting unit 14, a presenting unit 15, a schedule arranging unit 16, a processing controller 17, a candidate-expert-list memory 18, and a schedule-information memory 19. The search-condition receiving unit 11 receives search conditions that are input by a searcher on a predetermined search-condition input screen displayed on the display 27 in order to search for experts. The search device 10 according to this exemplary embodiment searches for experts or specialists having special knowledge or skills through a know-who search. In this exemplary embodiment, the experts and the like to be found are collectively called "experts". In addition, a person who wishes to search for experts by specifying search conditions is called a "searcher".

The relationship-level calculating unit 12 functions as a candidate-expert selecting unit that analyzes communication-tool use history and that selects a predetermined number of candidate experts having relationships at high levels with the searcher who wishes to search for experts in a category specified in search conditions. The expertise-level calculating unit 13 functions as a calculating unit that analyzes communication-tool use history of each of the selected candidate experts and that calculates an expertise level of each of the candidate experts in the category specified in the search conditions. The expert selecting unit 14 serves as an expert selecting unit that selects experts to be presented to the searcher from among the candidate experts on the basis of the expertise levels calculated by the expertise-level calculating unit 13. The presenting unit 15 presents to the searcher the experts selected from among the candidate experts by the expert selecting unit 14. The schedule arranging unit 16 refers to the experts' schedule information and adds the experts' schedule information to the information regarding the experts presented by the presenting unit 15. The processing controller 17 causes the search-condition receiving unit 11 to the schedule arranging unit 16 to operate in association with each other, thereby controlling an operation of a know-who search process performed by the search device 10. The candidate-expert-list memory 18 and the schedule-information memory 19 will be described later together with processing thereof.

The search-condition receiving unit 11 to the processing controller 17 in the search device 10 are realized by cooperation of a computer serving as the search device 10 and programs executed by the CPU 21 of the computer. The candidate-expert-list memory 18 and the schedule-information memory 19 are realized by the HDD 24 of the search device 10. Alternatively, the candidate-expert-list memory 18 and the schedule-information memory 19 may be realized by the RAM 23 or an external memory via a network.

The programs used in this exemplary embodiment may be provided by using a communication medium or may be stored in a computer readable recording medium such as a compact disc read-only memory (CD-ROM) or a universal serial bus (USB) memory. The programs provided from the communication medium or the recording medium are installed on a computer, and the CPU 21 of the computer sequentially executes the programs, thereby realizing various processes.

Figure 3:
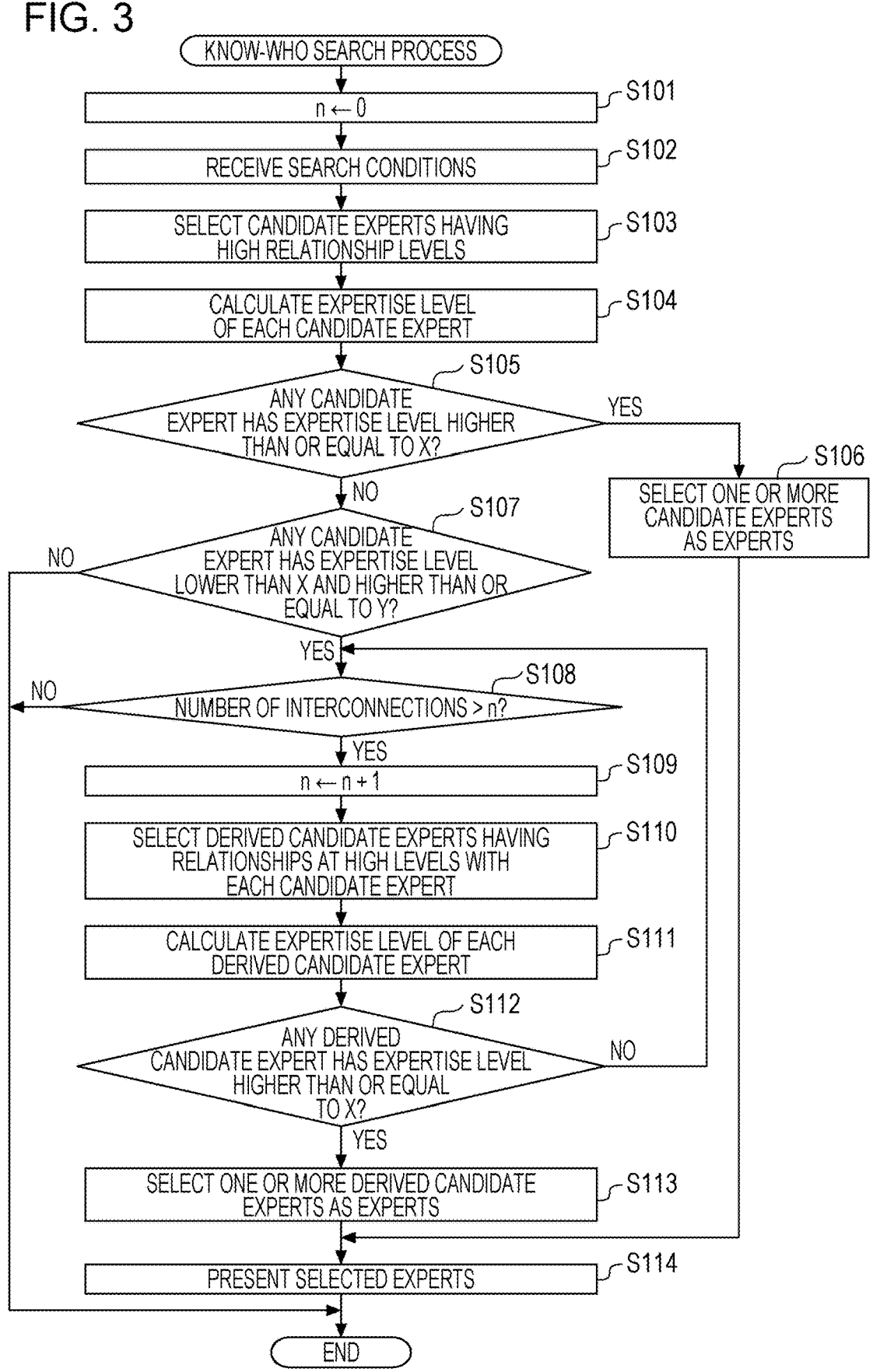
FIG. 3 is a flowchart illustrating a know-who search process in this exemplary embodiment.

Next, a know-who search process in this exemplary embodiment will be described with reference to the flowcharts illustrated in FIG. 3.

First, a variable n to be compared with a specified number of interconnections is initialized to 0 (step S101). A user who wishes to search for experts performs a predetermined operation to cause the display 27 to display a search-condition input screen. FIG. 4 illustrates an example of the search-condition input screen. In the exemplary screen illustrated in FIG. 4, the user inputs an operator, a keyword, a number of interconnections, and a period. The user specifies the searcher in the "operator" box typically by inputting a user identification (ID) or the like, which is identification information of the user who performs a know-who search. However, the user does not necessarily specify the user as the searcher. In this exemplary embodiment, any user specified in the operator box is referred to as the "searcher". The user inputs in the "keyword" box a keyword that indicates a category, special field, or expertise (hereinafter collectively referred to as a category) in which the user wishes to search for experts. The user inputs in the "number of interconnections" box a numerical value that represents relationships between the searcher and experts. For example, in a case where the user wishes to search only for experts having direct relationships with the searcher, the user inputs 0; in a case where the user wishes to expand the search targets to experts having direct relationships with the above experts having direct relationships with the searcher, the user inputs 1. In this manner, by inputting the number of interconnections, the user defines the range (relationships) of search targets from the searcher. In this exemplary embodiment, experts are presented to the searcher through analysis of communication-tool use history. Here, the user inputs in the "period" box a period of the communication-tool use history that is to be analyzed. Upon the user's input of the above specific items on the search-condition input screen, the search-condition receiving unit 11 receives the input search conditions (step S102).

Note that the term "communication tool" in this exemplary embodiment refers to an application tool that is used for communication among users. Examples of the communication tool include a general tool such as email, social networking service (SNS), or instant message. Examples of the communication tool further include a tool developed in a company or a tool specialized for business. The term "communication-tool use history" refers to history of sent and received emails, history of uploaded SNS messages and viewed SNS pages, minutes of a meeting related to a certain business, information on history of a task or project, and the like.

In step S103, the relationship-level calculating unit 12 analyzes communication-tool use history, calculates relationship levels between the searcher and other users, and selects persons having high relationship levels as candidate experts. This exemplary embodiment describes an exemplary case where history of sent and received emails is referred to as the communication-tool use history.

FIG. 5 illustrates an exemplary data structure of a communication information management table for email. The relationship-level calculating unit 12 may obtain this table from an external email server or the like. Alternatively, the relationship-level calculating unit 12 may obtain information from an email server or the like and may create such a table on the basis of the information. The communication information management table indicates history of emails that were sent and received during the period defined on the search-condition input screen. More specifically, the communication information management table includes information regarding a sender, a recipient (To), a recipient (carbon copy, CC), a recipient (blind carbon copy, BCC), a subject, a body, and an attached file of the respective emails. The relationship-level calculating unit 12 analyzes the use history included in this table and creates a relationship-level analysis-result table, which is illustrated in FIG. 6, as follows.

First, the relationship-level calculating unit 12 extracts records of sending and receiving of emails related to the searcher ("user A" in this exemplary embodiment) specified in the operator box on the search-condition input screen. More specifically, the relationship-level calculating unit 12 extracts the history records of emails in which the user A is set as a sender or a recipient. Then, for each of the users at the other end, among the emails that were sent and received to and from the user A, the relationship-level calculating unit 12 adds up each of the following items: the number of sent emails, the number of received emails as a recipient (To), the number of received emails as a recipient (CC), and the number of received emails as a recipient (BCC), which are illustrated in FIG. 6. The number of sent emails is the number of emails sent by the user A as a sender to each of the users at the other end. The number of received emails as a recipient (To) is the number of emails sent by the user by specifying the user A as a recipient (To). The number of received emails as a recipient (CC) is the number of emails sent by the user by specifying the user A as a recipient (CC). The number of received emails as a recipient (BCC) is the number of emails sent by the user by specifying the user A as a recipient (BCC). In this exemplary embodiment, the sent emails are not classified as "To" or "CC" unlike the received emails. However, the sent emails may be classified, and the number thereof may be added up according to the classification. The term "flag for 0 interconnections" is flag information indicating whether the searcher is directly acquainted with each user. The flag is automatically set by determining whether the searcher is directly acquainted with another user depending on whether the user is in the searcher's friend list on an SNS, whether the searcher and the user have once belonged to the same team according to organization data, or whether a certain number of direct communications have been made between the searcher and the user according to communication-tool use history. In this example, "YES" is set for each user, which indicates that the searcher is directly acquainted with the user.

Then, the relationship-level calculating unit 12 normalizes the above-described added values. That is, the relationship-level calculating unit 12 converts the added values of each item on the basis of the maximum value of the item by converting the maximum value to 100. For example, among the numbers of sent emails, the number of emails sent to the user B is the maximum, which is 657. Accordingly, this value is converted into 100, and the numbers of emails sent to the other users are normalized.

After normalizing the numbers, the relationship-level calculating unit 12 calculates the relationship level according to the following equation.

(Relationship level)=factor 1×element 1+factor 2×element 2+ . . .

For example, the relationship-level calculating unit 12 calculates the relationship level according to the following equation.

(Relationship level)=0.8×(Normalized number of sent emails)+0.7×(Normalized number of received emails as recipient (To))+0.5×(Normalized number of received emails as recipient (CC))+0.3×(Normalized number of received emails as recipient (BCC))

Note that each of the factors weights the corresponding element. Typically, the number of received emails as a recipient (To) is weighted more than the number of received emails as a recipient (CC) or a recipient (BCC).

Although the use history of emails is used as communication-tool use history in the above example, use history of another communication tool or other communication tools may be analyzed, and the relationship levels may be calculated.

In the above manner, the relationship levels are calculated for individual users who have sent and received emails directly to and from the user A, in other words, for individual users having direct relationships with the user A. From among the above users, a predetermined number of users are selected in descending order of the relationship level as candidate experts. In the following description of this exemplary embodiment, it is assumed that five users are selected. If the predetermined number is a small number, users who are well acquainted with the user A are selected as the candidate experts, but it is highly uncertain whether users having high expertise levels are selected as candidate experts.

In step S104, the expertise-level calculating unit 13 calculates an expertise level of each of the candidate experts selected by the relationship-level calculating unit 12. This exemplary embodiment describes an exemplary case where use history of an SNS, such as use history of an electronic bulletin board, is referred to as communication-tool use history.

The expertise-level calculating unit 13 refers to use history of an electronic bulletin board tool and analyzes the use history of each of the candidate experts during the period defined on the search-condition input screen. FIG. 7 illustrates an exemplary data structure of an expertise-level analysis-result table in this exemplary embodiment. The expertise-level calculating unit 13 creates the expertise-level analysis-result table.

The expertise-level calculating unit 13 searches the history of the electronic bulletin board for the keyword specified on the search-condition input screen. Then, the expertise-level calculating unit 13 obtains the number of messages, the number of related words, and the number of page views of each candidate expert. The number of messages is the number of posts including the keyword among posts uploaded by each candidate expert on the electronic bulletin board. The number of related words is the number of times the keyword appears in posts uploaded by the candidate expert on the electronic bulletin board. The number of page views is the number of times posts uploaded by the candidate expert on the electronic bulletin board have been viewed. Alternatively, the number of page views may be any number representing other users' responses to the posts, such as the number of comments or "Likes" with respect to the posts. In addition, the search target is not limited to the input keyword "web marketing" and may also include similar words.

Then, the expertise-level calculating unit 13 calculates the expertise level according to the following equation.

(Expertise level)=factor 1×element 1+factor 2×element 2+ . . .

For example, the expertise-level calculating unit 13 calculates the expertise level according to the following equation.

(Expertise level)=0.8×(Number of messages)+0.05×(Number of related words)+0.01×(Number of page views)

Note that each of the factors weights the corresponding element.

As in the calculation of the relationship level, the expertise level may be calculated after each element is normalized. Although the use history of an electronic bulletin board is used as communication-tool use history in the above example, use history of another communication tool or other communication tools may be analyzed to calculate the expertise level.

In the above manner, the expertise-level calculating unit 13 calculates the expertise level of each of the candidate experts who are directly acquainted with the searcher. Then, the expertise-level calculating unit 13 creates the expertise-level analysis-result table, which is illustrated in FIG. 7, and stores this table in the candidate-expert-list memory 18.

Then, from among the candidate experts who are selected in the above manner or persons other than the candidate experts in some cases, the expert selecting unit 14 selects experts to be presented to the searcher. Note that in this exemplary embodiment, thresholds X and Y (X>Y) are set in advance. The threshold X is a value at which a person is recognized as an expert, and the threshold Y is a value at which a person is not recognized as an expert but is recognized as a person having a certain level of expertise. First, if any of the candidate experts has an expertise level higher than or equal to the threshold X (YES in step S105), the expert selecting unit 14 selects one or more candidate experts as experts (step S106). If the threshold X is set to 60, the expert selecting unit 14 selects users B, C, and G from the expertise-level analysis-result table, which is illustrated in FIG. 7. Then, the presenting unit 15 presents the elected experts to the searcher (step S114). Since the user A, who is the searcher, is directly acquainted with the presented experts, the user A may contact an expert whom the user A is inclined to ask to provide expertise.

If none of the candidate experts have expertise levels higher than or equal to the threshold X (NO in step S105), no experts in the specified category are included in the persons who are directly acquainted with the user A or the searcher and who have relationships at high levels with the user A. However, even if no experts are included in the persons who are directly acquainted with the user A, it may be possible that candidate experts who are regarded as persons having certain levels of expertise (candidate experts having expertise levels higher than or equal to the threshold Y) are directly acquainted with persons having more expertise in the category than the candidate experts.

Accordingly, in this exemplary embodiment, if any of the candidate experts has an expertise level lower than the threshold X and higher than or equal to the threshold Y (YES in step S107), the expert selecting unit 14 expands the search range for searching for experts to persons who are directly acquainted with the candidate experts. However, if the searcher restricts the search range only to persons who are directly acquainted with the searcher by the search conditions, that is, if the searcher specifies 0 as the number of interconnections in the search conditions (NO in step S108), the process ends without expanding the search range. If none of the candidate experts have expertise levels lower than the threshold X and higher than or equal to the threshold Y (NO in step S107), the process also ends.

On the other hand, if 1 or more is specified as the number of interconnections in the search conditions (YES in step S108), the process proceeds to a step of searching for experts by expanding the search range. First, 1 is added to n for the next cycle (step S109). Then, the expert selecting unit 14 requests the relationship-level calculating unit 12 to perform processing and selects new candidate experts having relationships at high levels with each of the above-described candidate experts having expertise levels of lower than the threshold X and higher than or equal to the threshold Y (step S110). In this case, from among persons who are directly acquainted with the candidate experts who are directly acquainted with the searcher, the new candidate experts are selected. Such new candidate experts who are not directly acquainted with the searcher are called "derived candidate experts" in this exemplary embodiment.

Upon selecting the derived candidate experts, the expert selecting unit 14 requests the expertise-level calculating unit 13 to perform processing, and an expertise level of each of the derived candidate experts is calculated (step S111). Through the above processing, the expert selecting unit 14 obtains the expertise levels and the relationship levels of the derived candidate experts. FIG. 8 illustrates an exemplary data structure of an expertise-level and relationship-level analysis-result table. FIG. 8 indicates the expertise levels and the relationship levels calculated through the above processing. In addition, in FIG. 8, a derived route is set in order to indicate which user mediates between the searcher and each of the derived candidate experts.

Here, it is assumed that the threshold X is set to 60 and that the threshold Y is set to 40. In the example illustrated in FIG. 7, each of the users B, C, and G has an expertise level higher than or equal to the threshold X and is determined to be a candidate expert. However, in this case, it is assumed that such users do not exist. In such a case, a user J is determined to be a candidate expert, and the above processing is performed for the user J. According to the example illustrated in FIG. 8, users H, S, and P are derived candidate experts. Although the user J is directly acquainted with the users H, S, and P, the user A is not directly acquainted with the users H, S, and P. Therefore, the relationship between the user A and each of the users H, S, and P is represented as a number of interconnections of 1. Strictly speaking, there is a possibility that the users H, S, and P are not selected in step S103 because the users H, S, and P have low relationship levels.

If any of the derived candidate experts has an expertise level higher than or equal to the threshold X (YES in step S112), the expert selecting unit 14 selects one or more derived candidate experts as experts (step S113). Then, the presenting unit 15 presents the selected experts to the searcher (step S114).

On the other hand, if none of the derived candidate experts have expertise levels higher than or equal to the threshold X (NO in step S112), as long as the number of interconnections is smaller than or equal to the number of interconnections specified by the searcher (YES in step S108), the expert selecting unit 14 repeats the above-described step S109 and subsequent steps and selects experts (step S113). In repeating step S109 and subsequent steps, if the number of interconnections exceeds the number of interconnections specified by the searcher (NO in step S108), the process ends.

According to this exemplary embodiment, experts are thus selected from among persons who are directly acquainted with the searcher. Therefore, the searcher may be inclined to ask the experts to provide expertise. Even if the searcher is not directly acquainted with the experts, the experts having close relationships are selected. Therefore, although the searcher may be more disinclined to contact the experts than in a case where the searcher is directly acquainted with experts, the searcher may still be more inclined to contact the experts than in a case where the searcher does not have any relationship with experts. In some cases, the searcher may contact the experts via a person who is directly acquainted with the searcher.

In this exemplary embodiment, if none of the candidate experts have expertise levels higher than or equal to the threshold X, the above processing (step S108 and subsequent steps) is performed for candidate experts having expertise levels lower than the threshold X and higher than or equal to the threshold Y. However, this processing may be performed unconditionally even if any of the candidate experts has an expertise level higher than or equal to the threshold X. Alternatively, this processing may be performed only if a few candidate experts have expertise levels higher than or equal to the threshold X. The searcher will eventually decide a person or persons to contact from among the presented experts, and in addition, data regarding the relationship levels and the expertise levels of the respective experts is presented. Accordingly, it is desirable that a certain number of experts are presented to the searcher.

The above description provides an example in which, if candidate experts who are directly acquainted with the searcher have expertise levels lower than the threshold Y, and if derived candidate experts have expertise levels lower than the threshold X, such candidate experts and derived candidate experts are not presented as experts to the searcher. However, the searcher may find such presentation inconvenient. Therefore, the above experts may also be presented in the following manner.

That is, without calculating the relationship levels, the expert selecting unit 14 requests the expertise-level calculating unit 13 to perform processing and selects, as candidate experts, a predetermined number (L) of persons in descending order of the expertise level. Then, the expert selecting unit 14 requests the relationship-level calculating unit 12 to perform processing, and a relationship level of each of the candidate experts is calculated. Then, the expert selecting unit 14 selects, as experts, candidate experts having relationship levels higher than or equal to a predetermined threshold Z. If the expert selecting unit 14 fails to select experts, the above processing is repeated while the predetermined number (L) for selecting candidate experts is increased until candidate experts having relationship levels higher than or equal to the predetermined threshold Z are selected. In this manner, even in such a case of a failure in selecting experts, candidate experts having relationship levels higher than or equal to the predetermined threshold Z are selected so that experts having some relationships, if any, with the searcher may be selected. If experts are selected by sacrificing the relationship levels to some extent, it is desirable that the presenting unit 15 notifies the searcher of this fact. FIG. 9 illustrates an exemplary data structure of an expertise-level and relationship-level analysis-result table of experts selected through the above processing. In this processing, since the experts are selected by sacrificing the relationship levels to some extent, experts having high expertise levels may be selected.

The presenting unit 15 in this exemplary embodiment presents experts to the searcher in the above manner. Typically, the presenting unit 15 presents, to the searcher, details of content in the tables illustrating analysis results of the relationship levels, the expertise levels, and the like, which are illustrated in FIGS. 7 to 9 and are obtained through the above processing. It is assumed that the searcher typically refers to the analysis results, selects an expert having a high relationship level and a high expertise level, contacts the expert, and asks the expert to provide expertise face to face. However, since the expert has their own schedule, it is not always possible for the searcher to meet the expert even if the searcher contacts the expert.

Accordingly, in this exemplary embodiment, the expert's schedule or the like may also be presented to the searcher. Details of this presentation made by the presenting unit 15 will be described below.

FIG. 10 illustrates an exemplary data structure of schedule information stored in the schedule-information memory 19 in this exemplary embodiment. The schedule information includes each user's schedule, which is schedule information of at least the searcher and an expert. Specifically, the following information is set in association with a user ID of each user: an event ID that identifies details of a schedule, the name of the event, scheduled start time and date of the event, scheduled end time and date of the event, and the place of the event.

The schedule arranging unit 16 analyzes schedule information of the searcher and the expert stored in the schedule-information memory 19 and simulates a meeting of the searcher and the expert by taking a travelling time into account if travelling is necessary.

Figure 11:
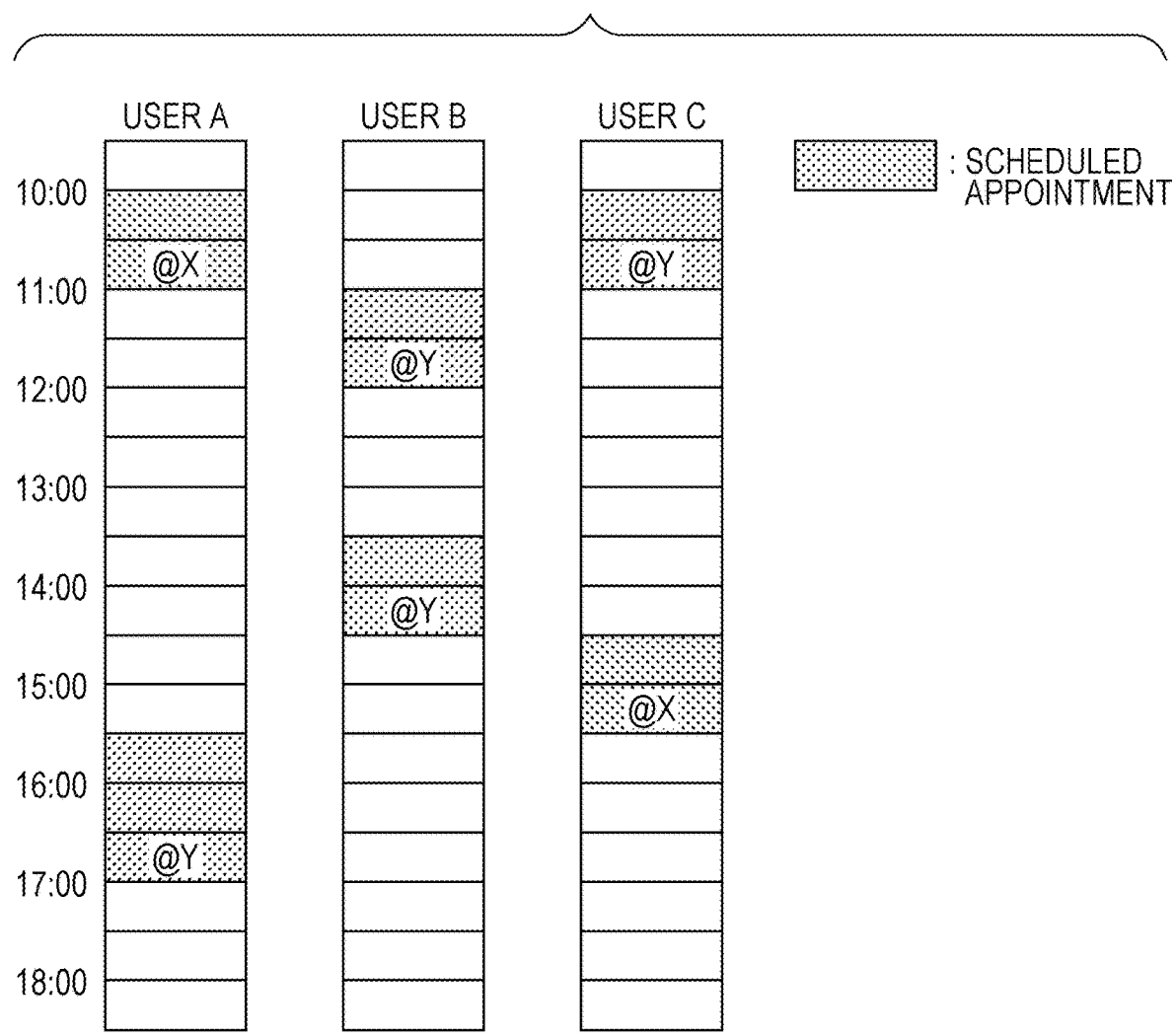
FIG. 11 is a conceptual diagram illustrating relationships among a searcher's schedule and first and second experts' schedules in this exemplary embodiment.
Figure 12:
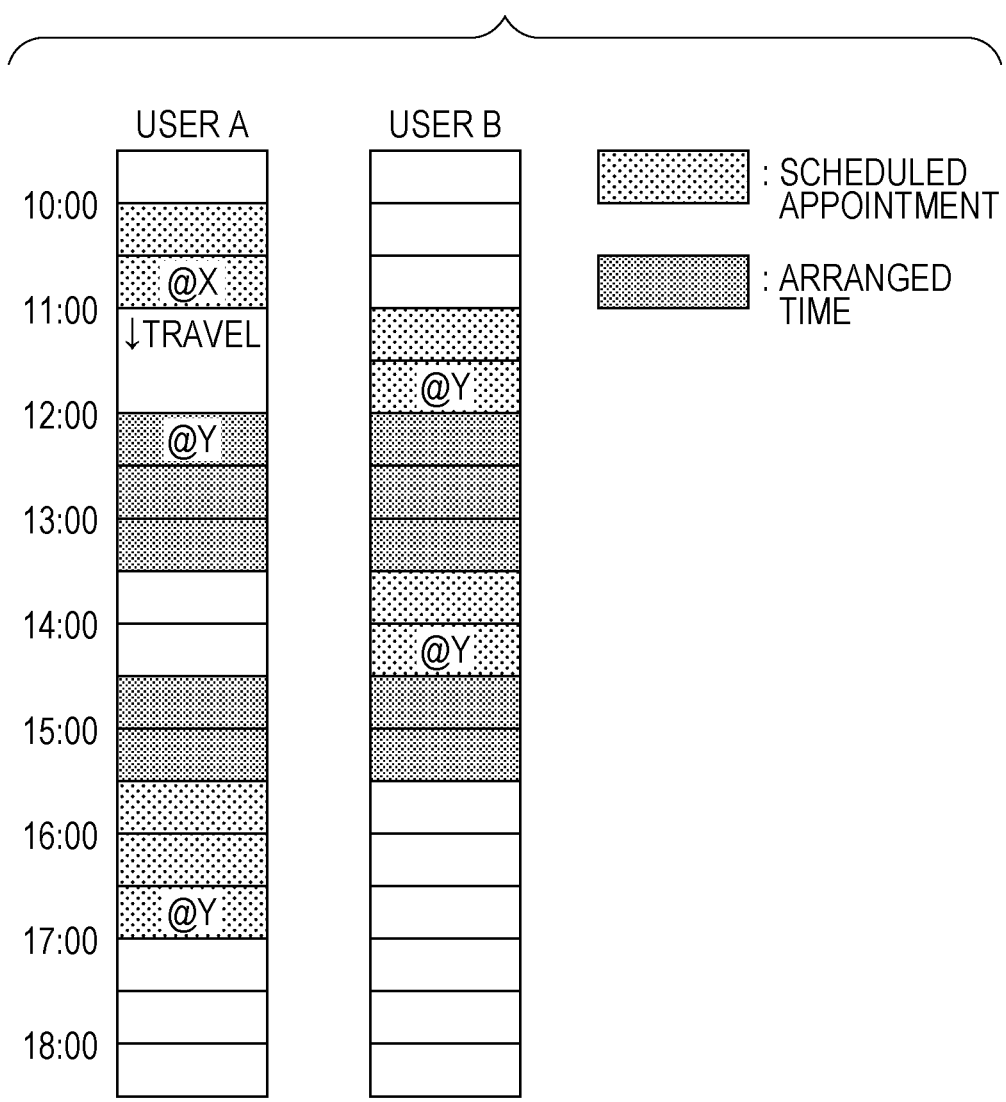
FIG. 12 is a conceptual diagram illustrating a case of setting a meeting time for the searcher and the first expert on the basis of the searcher's schedule and the first expert's schedule in this exemplary embodiment.

For example, as illustrated in FIG. 11, the schedule of the searcher (the user A) is compared with the schedules of the users B and C, who are experts. On a certain day, the user A has an appointment at office X and later an appointment at office Y. On the same day, the user B has two appointments at only office Y. The schedule arranging unit 16 determines periods of time during when the users A and B are available and determines a place where the users A and B will meet by taking a travelling time into account if travelling is necessary. As a result, as illustrated in FIG. 12, if the user A travels to office Y as soon as the appointment at office X ends, the user A may meet the user B at office Y between the user B's two appointments or after the end of the user B's second appointment.

Figure 13:
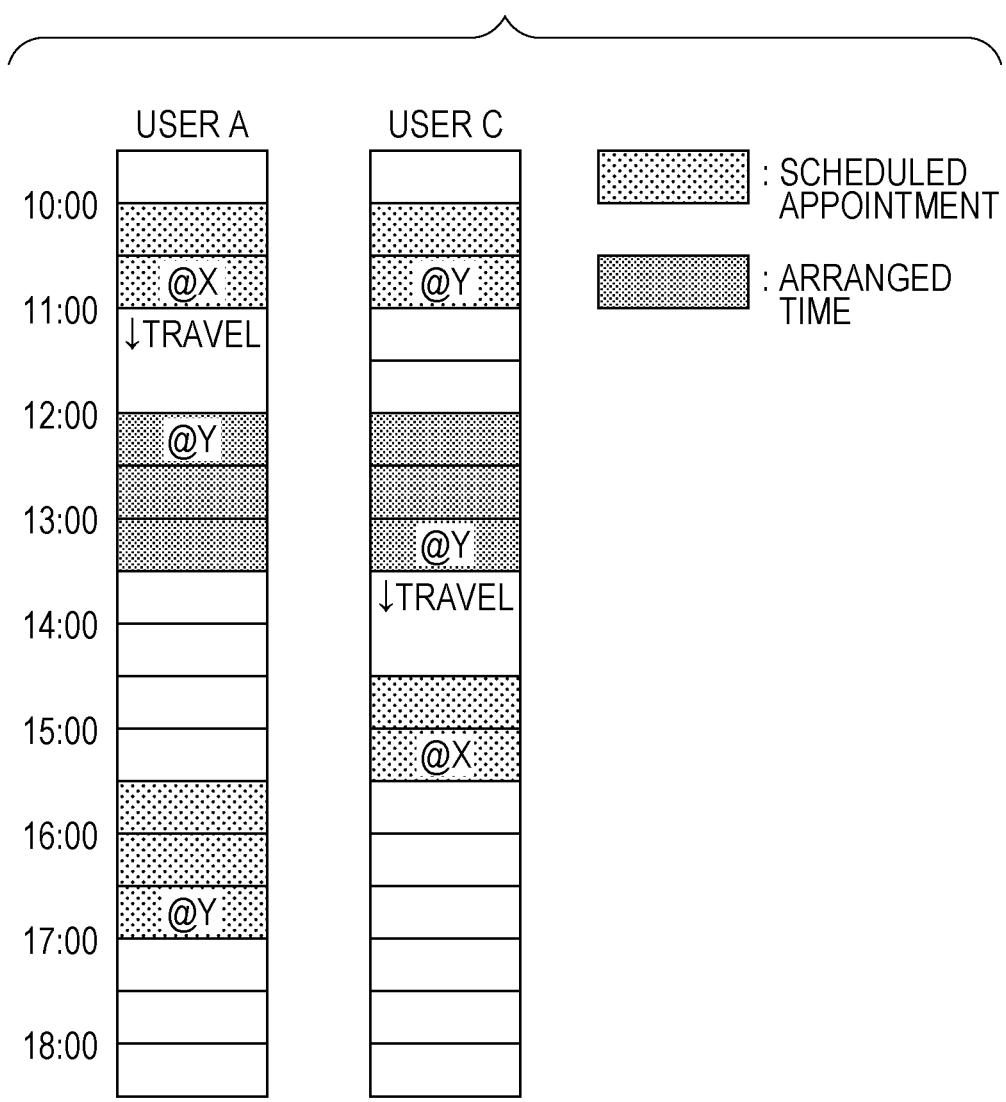
FIG. 13 is a conceptual diagram illustrating a case of setting a meeting time for the searcher and the second expert on the basis of the searcher's schedule and the second expert's schedule in this exemplary embodiment.
Figure 14:
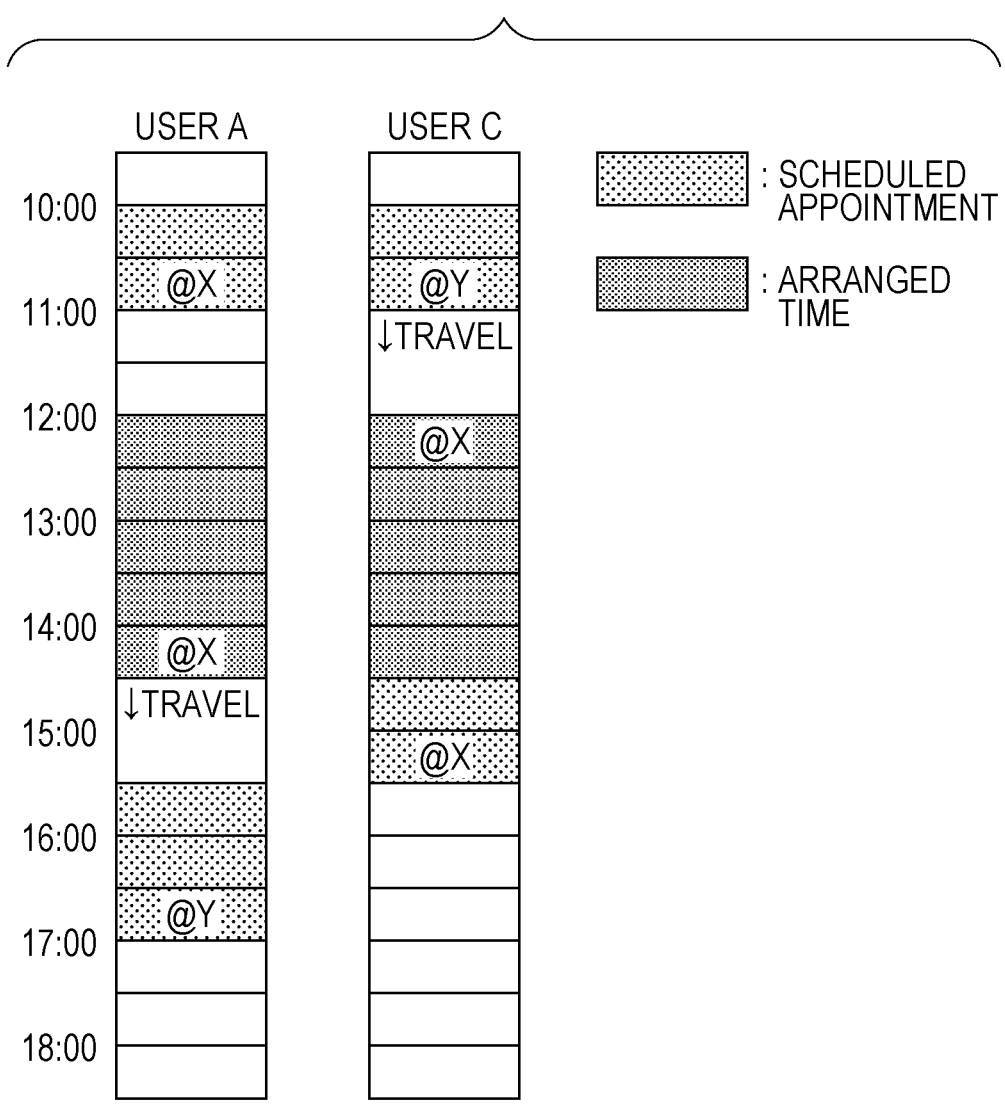
FIG. 14 is a conceptual diagram illustrating another case of setting a meeting time for the searcher and the second expert on the basis of the searcher's schedule and the second expert's schedule in this exemplary embodiment.

On the same day, the user C has an appointment at office Y and later an appointment at office X. The schedule arranging unit 16 determines periods of time during when the users A and C are available and determines a place where the users A and C will meet by taking travelling times into account if travelling is necessary. As a result, the following case may be possible as an example. As illustrated in FIG. 13, if the user A travels to office Y as soon as the appointment at office X ends, the user A may soon after meet the user C at office Y. The user C may have time to meet the user A until 13:30 by taking into account the time to travel from office Y to office X. Alternatively, the following case may be possible as another example. As illustrated in FIG. 14, the user C may travel to office X as soon as the appointment at office Y ends by taking the next appointment into account. The user A may have time to meet the user C until 14:30 by taking into account the time to travel to office Y.

Figure 15:
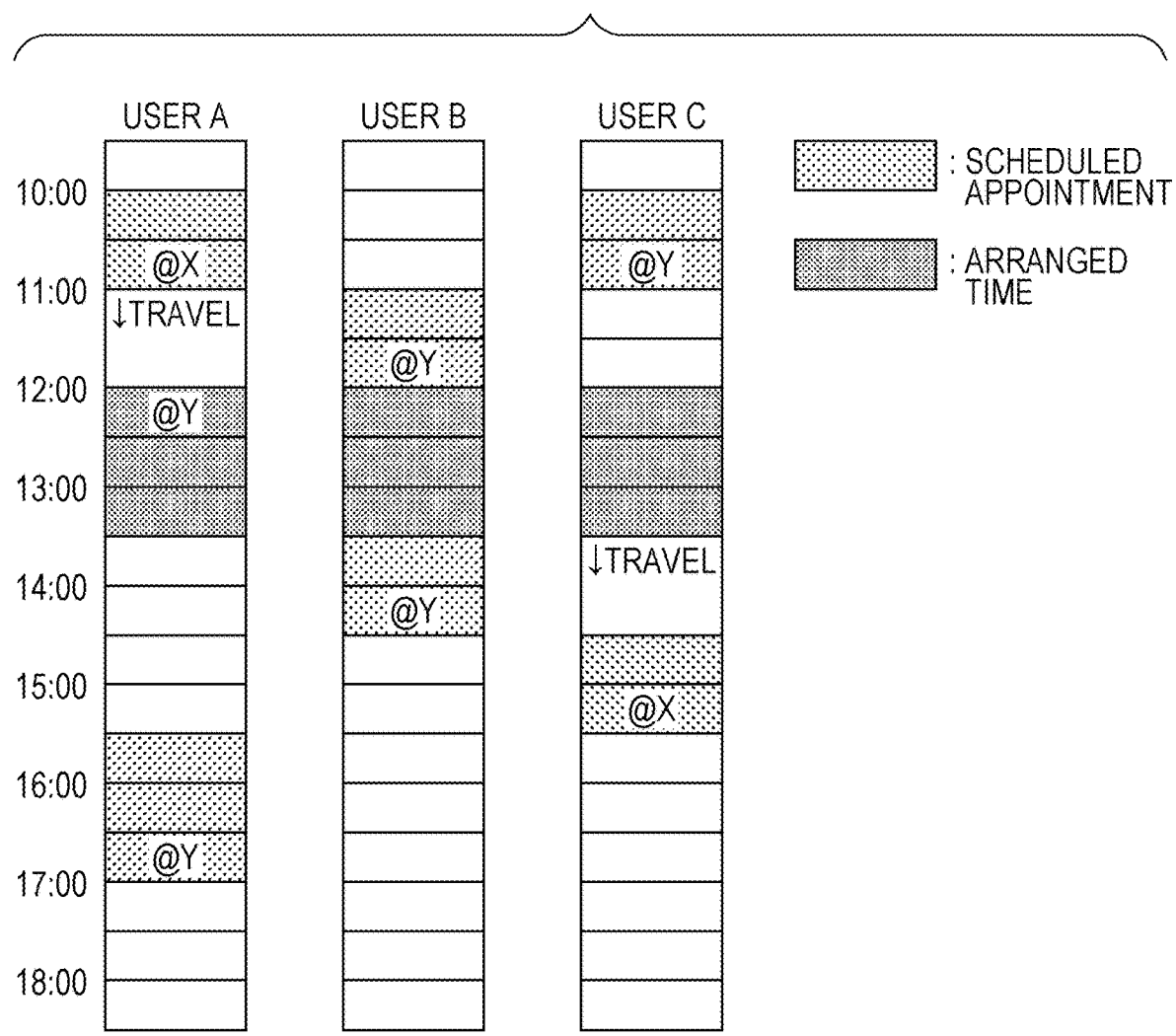
FIG. 15 is a conceptual diagram illustrating a case of setting a meeting time for the searcher, the first expert, and the second expert on the basis of the searcher's schedule and the first and second experts' schedules in this exemplary embodiment.

Although the above-described cases illustrate schedule arrangement between two persons, it may be possible to determine whether three persons have time to meet with each other. The schedule arranging unit 16 determines periods of time during when the users A, B, and C are available and determines a place to meet by taking travelling times into account if travelling is necessary. As a result, as illustrated in FIG. 15, all of the three persons may have time to meet with one another from 12:00 until 13:30 at office Y.

In the above manner, the presenting unit 15 may present the search results to the searcher together with specific meeting times determined by the schedule arranging unit 16.

Figure 16:
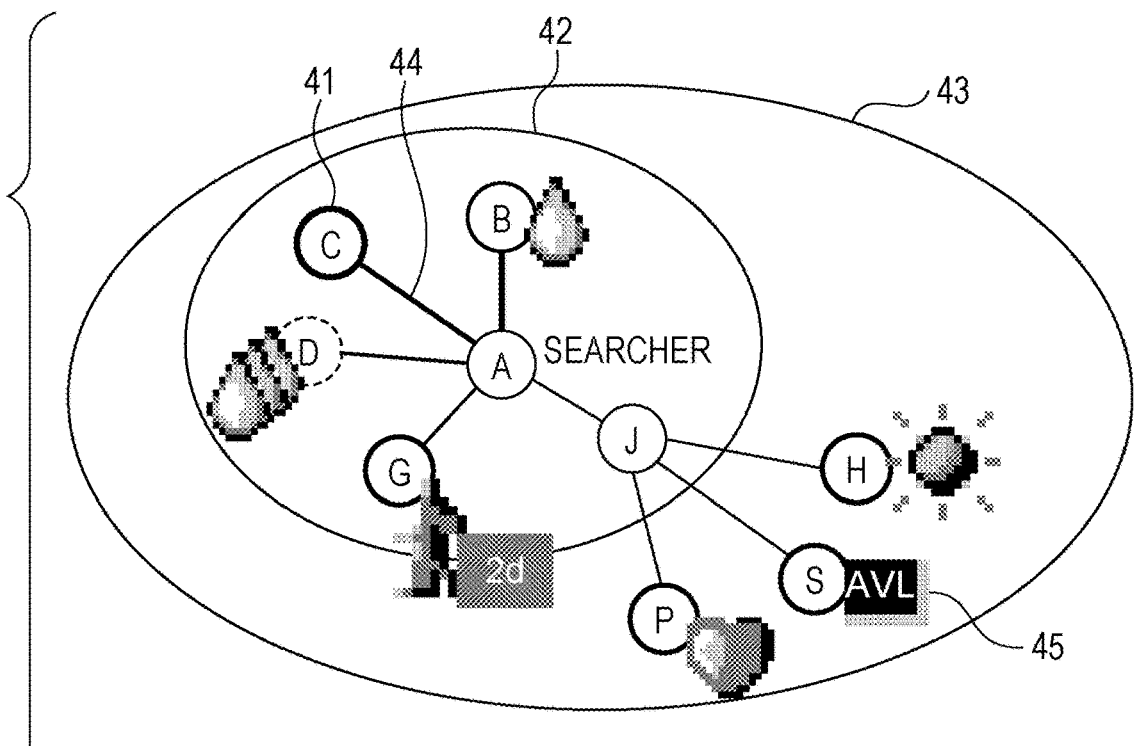
FIG. 16 illustrates an example of displayed details presented by a presenting unit in this exemplary embodiment.

FIG. 16 illustrates an example of how the presenting unit 15 presents results of a know-who search process. In FIG. 16, circular nodes 41 are displayed around the searcher (user A), and the nodes 41 represent respective candidate experts (users B, C, D, G, and J) selected through the above-described know-who search process. In FIG. 16, further, nodes 41 representing experts (users H, S, and P) derived from the user J are displayed. The nodes 41 are connected via lines (arcs) 44, and connection relationships of the lines 44 represent relationships between the users. In FIG. 16, among the nodes 41, nodes 41 representing the persons who are directly acquainted with the user A and who have a number of interconnections of 0 are illustrated within a first ellipse 42. The other nodes 41 representing experts who are derived from a person who is directly acquainted with the user A and who have a number of interconnections of 1 are illustrated outside the first ellipse 42 and within a second ellipse 43 surrounding the first ellipse 42.

The lines defining the nodes 41 differ in thickness depending on expertise levels. In this exemplary embodiment, thicker lines represent higher expertise levels. In addition, the lines 44 that connect the nodes 41 differ in thickness depending on relationship levels. In this exemplary embodiment, thicker lines represent higher relationship levels.

By referring to the results of a know-who search process, the searcher may clearly understand human relationships in addition to the degree of the expertise levels. Accordingly, the searcher may easily decide which person to ask to provide expertise depending on whether the searcher is inclined to contact the person or ask a favor, for example.

Note that shapes of the nodes 41 and the ellipses 42 and 43 illustrating the degree of the levels of relationships with the user A are not limited to those illustrated in FIG. 16. The ellipses 42 and 43 are not necessarily illustrated as ellipses as long as it is to be clearly understood that a person is directly acquainted with the searcher or a person is derived, and if a person is derived, the class (number of interconnections) of the person is illustrated in a comprehensive manner, that is, the level of relationships between the person and the searcher is illustrated in a comprehensive manner. For example, various attributes such as shape, size, line type, and color may be illustrated in different manners.

Furthermore, FIG. 16 visually and schematically illustrates states of the respective users by using various marks 45 by analyzing schedule information and communication-tool use history of the users. For example, a user who is constantly posting many messages is determined to seem willing to listen to and give advice to the searcher even if busy, and a user who has many positive words in the messages is determined to seem happy. Referring to the types of marks 45, the searcher, who is the user A, may clearly understand which expert is appropriate to contact efficiently.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A search device comprising:
a processor programmed to:
select a candidate expert having a determined level of relationship with a searcher searching for an expert, the expert having an expertise in a specified category and having a level of expertise based on analyzing the use history of the communication tool, the level of relationship being determined based on a history of communications between the searcher and each of a plurality of experts by weighting each type of communication in the history of communications, and summing a weighted number of each type of communication, the selecting of the candidate expert including:
assigning a weighted value to the level of expertise according to the use history,
comparing the weighted value of the level of expertise to a first predetermined threshold value,
upon the weighted value exceeding the first predetermined threshold value, identifying the candidate expert as an expert, and upon the weighted value failing to exceed the first predetermined threshold value and exceeding a second predetermined threshold value, which is lower than the first predetermined threshold value, identifying the candidate expert as a candidate expert with expertise,
selecting, as derived candidate experts, a predetermined number of candidate experts having relationships at determined levels with the candidate expert having the level of expertise that is lower than the first predetermined threshold value,
analyzing the use history of the communication tool of each of the selected derived candidate experts and calculate the level of expertise of each of the selected derived candidate experts in the category, and
selecting, as the expert, only one or more derived candidate experts having determined levels of expertise that are equal to or greater than the first predetermined threshold value from among the derived candidate experts; and
display the selected expert to the searcher as a diagram illustrating the relationship between the selected candidate expert and the searcher, the relationship being illustrated by a line, and the expert and the searcher being illustrated by nodes.

2. The search device according to claim 1, wherein, in a case where the levels of expertise of the derived candidate experts are lower than the first predetermined threshold value, the processor is programmed to repeatedly perform processing to select the derived candidate experts as long as a number of interconnections is smaller than or equal to a number specified by the searcher.

3. A search method comprising:
selecting a candidate expert having a determined level of relationship with a searcher searching for an expert, the expert having an expertise in a specified category and having a level of expertise based on analyzing the use history of the communication tool, the level of relationship being determined based on a history of communications between the searcher and each of a plurality of experts by weighting each type of communication in the history of communications, and summing a weighted number of each type of communication, the selecting of the candidate expert including:
assigning a weighted value to the level of expertise according to the use history,
comparing the weighted value of the level of expertise to a first predetermined threshold value,
upon the weighted value exceeding the first predetermined threshold value, identifying the candidate expert as an expert, and upon the weighted value failing to exceed the first predetermined threshold value and exceeding a second predetermined threshold value, which is lower than the first predetermined threshold value, identifying the candidate expert as a candidate expert with expertise,
selecting, as derived candidate experts, a predetermined number of candidate experts having relationships at determined levels with the candidate expert having the level of expertise that is lower than the first predetermined threshold value, analyzing the use history of the communication tool of each of the selected derived candidate experts and calculate the level of expertise of each of the selected derived candidate experts in the category, and selecting, as the expert, only one or more derived candidate experts having determined levels of expertise that are equal to or greater than the first predetermined threshold value from among the derived candidate experts; and displaying the selected expert to the searcher as a diagram illustrating the relationship between the selected candidate expert and the searcher, the relationship being illustrated by a line, and the expert and the searcher being illustrated by nodes.

4. A non-transitory computer readable medium storing a program causing a computer to execute a process for search, the process comprising:

selecting a candidate expert having a determined level of relationship with a searcher searching for an expert, the expert having an expertise in a specified category and having a level of expertise based on analyzing the use history of the communication tool, the level of relationship being determined based on a history of communications between the searcher and each of a plurality of experts by weighting each type of communication in the history of communications, and summing a weighted number of each type of communication, the selecting of the candidate expert including:

assigning a weighted value to the level of expertise according to the use history, comparing the weighted value of the level of expertise to a first predetermined threshold value, upon the weighted value exceeding the first predetermined threshold value, identifying the candidate expert as an expert, and upon the weighted value failing to exceed the first predetermined threshold value and exceeding a second predetermined threshold value, which is lower than the first predetermined threshold value, identifying the candidate expert as a candidate expert with expertise, selecting, as derived candidate experts, a predetermined number of candidate experts having relationships at determined levels with the candidate expert having the level of expertise that is lower than the first predetermined threshold value, analyzing the use history of the communication tool of each of the selected derived candidate experts and calculate the level of expertise of each of the selected derived candidate experts in the category, and selecting, as the expert, only one or more derived candidate experts having determined levels of expertise that are equal to or greater than the first predetermined threshold value from among the derived candidate experts; and displaying the selected expert to the searcher as a diagram illustrating the relationship between the selected candidate expert and the searcher, the relationship being illustrated by a line, and the expert and the searcher being illustrated by nodes.

5. The search device according to claim 1, wherein the processor is programmed to display the level of expertise of the selected expert on the diagram.

6. The search device according to claim 1, wherein the processor is programmed to display a schedule of the selected expert on the diagram.

7. The search device according to claim 1, wherein the processor is programmed to display a state of the selected expert on the diagram.

8. The search device according to claim 1, wherein the processor is programmed to calculate the determined level of relationship based on a number of emails as sender, a number of emails as primary recipient, and a number of emails as carbon-copy recipient between the selected candidate expert and the searcher.

9. The search device according to claim 1, wherein the processor is programmed to display the selected expert and a schedule of the selected expert on the diagram.

\* \* \* \* \*